Aug. 5, 1941.   W. F. GAGNER   2,251,587
WEED EXTERMINATING TOOL
Filed July 17, 1939
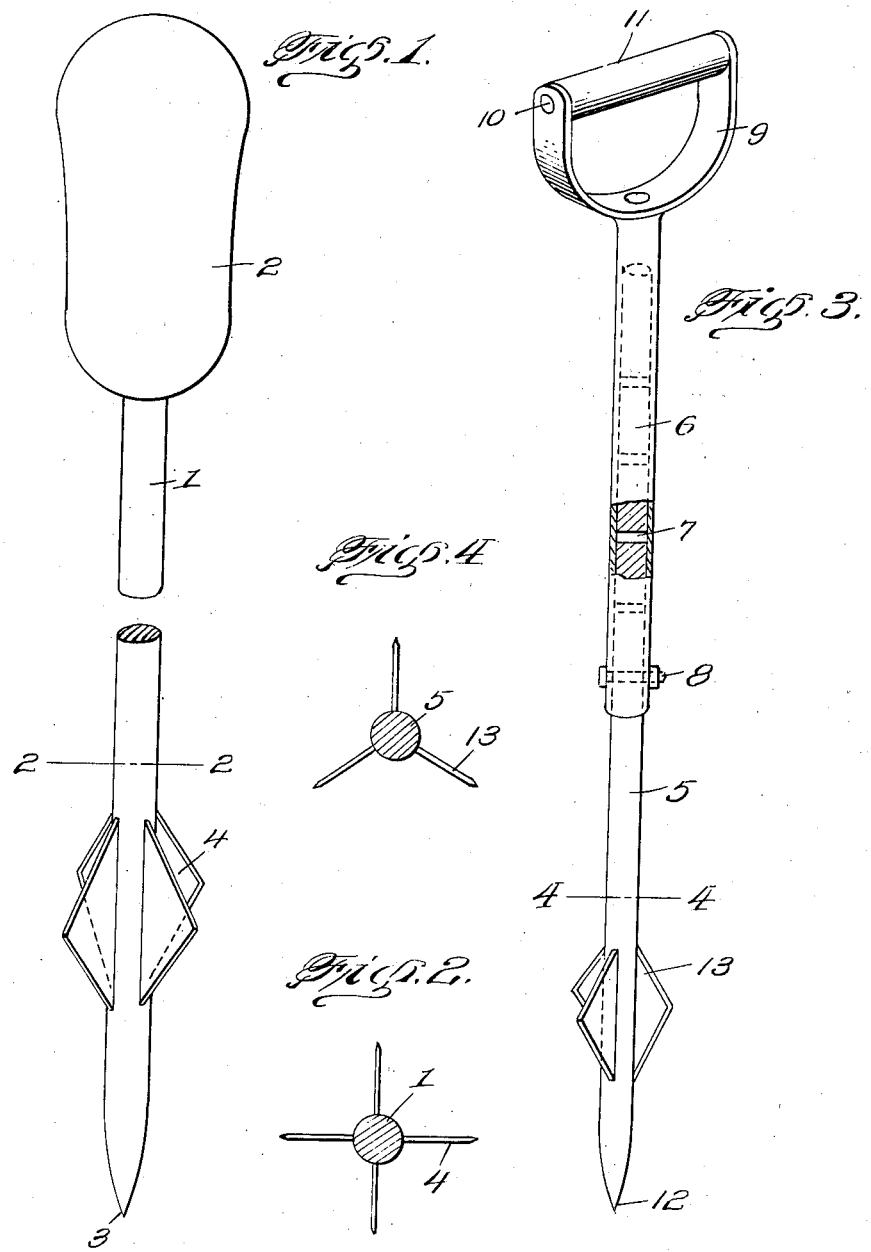
William F. Gagner, INVENTOR
BY Victor J. Evans & Co.
ATTORNEYS Patented Aug. 5, 1941

2,251,587

UNITED STATES PATENT OFFICE 2,251,587

WEED EXTERMINATING TOOL

William F. Gagner, Eugene, Oreg.

Application July 17, 1939, Serial No. 284,969

1 Claim. (Cl. 30—303)

This invention relates to weed exterminators, and its general object is to provide a tool which is primarily designed for use on lawns for destroying weeds, such as dandelions, thistles, or the like, with minimum disfigurement to the lawn, in that the tool includes flat radially disposed blades for passage through the ground perpendicular thereto and through the body and roots of the weed for severing the same, as well as completely dislodging the roots, so as to allow ready removal of the severed parts from the ground.

A further object is to provide a weed extracting tool that is capable of performing its intended function with minimum effort on the part of the user and includes a handle which may or may not be adjustable as to length, and is preferably of a length so that the tool can be conveniently used while the user is in standing position.

Another object is to provide a weed extracting tool that is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a perspective view of one form of tool which forms the subject matter of the present invention.

Figure 2 is a sectional view taken approximately on line 2—2 of Figure 1, looking toward the blades.

Figure 3 is a perspective view of a modified form of my tool.

Figure 4 is a sectional view taken approximately on line 4—4 of Figure 3, looking toward the blades.

Referring to the drawing in detail, and particularly to the form of Figures 1 and 2, the reference numeral 1 indicates the shank of that form, and which has secured to its upper end a handle 2, the latter having a socket bore therein within which the shank is mounted and fixed accordingly by any suitable means. The handle of this form is shown as being of substantially oval formation, and extends lengthwise of the shank, as shown.

The shank is tapered at its lower end to provide a ground penetrating point 3, and secured to the shank in close proximity to its lower end, is a plurality of substantially triangular shaped flat cutting blades 4 which have beveled outer edges extending through the apex portions thereof and the base portions of the blades are fixed to the shank in a manner whereby the blades radiate therefrom and are disposed axially with respect to the shank, as clearly shown in Figure 1, so that when the tool is in use the blades will be arranged perpendicular to the ground, to allow for easy insertion and withdrawal thereof, as will be apparent. It will be noted from Figure 2 that this form includes four blades arranged in pairs disposed at right angles with respect to each other.

In the form of Figures 3 and 4, the shank is indicated by the reference numeral 5, and this form includes an adjustable handle provided with a tubular portion 6 having the shank 5 telescopically mounted therein, for the adjustment of the handle with respect to the shank, as will be apparent upon inspection of Figure 3. In order to secure the handle in adjusted positions, it will be noted that the shank 5 is provided with a plurality of equi-distantly spaced bores 7 extending transversely therethrough and the tubular portion 6 adjacent to its lower end is provided with registering openings to register with the bores for the purpose of receiving the bolt of a bolt and nut connection 8.

Formed on or otherwise secured to the upper end of the tubular portion 6 is an arcuate or bail member 9 having secured to and bridging the outer ends thereof a headed bolt 10 which has mounted thereon a sleeve 11 providing a hand grip for the tool, as will be apparent.

The lower end of the shank 5 is likewise tapered to provide a penetrating point 12 and secured to the shank 5 adjacent to the lower end is a plurality of cutting blades 13 which are also of substantially triangular shape, with beveled outer edges, and have their base portions fixed to the shank for the disposal of the blades 13 axially thereof as well as to radiate therefrom, in the same manner as the blades 4 of the form of Figures 1 and 2. However, I have shown only three blades 13 that are arranged an equal distance apart about the shank, as best shown in Figure 4.

In the use of my tool, it is inserted in the center of the weed, to an extent so that the blades cut through the body and roots of the weed, thence the tool is given a rotary motion which completely dislodges the roots, so as to allow ready removal of the severed parts from the ground.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A weed exterminator comprising a handled shank having a lower end terminating in a ground penetrating point, a plurality of identical flat substantially triangular shaped cutting blades having their base portions fixed to the shank for disposal of the blades radially in equidistantly spaced relation to each other from the shank and along the axis thereof, said blades having beveled outer edges extending from the juncture of the blades with the shank and about the apex portions thereof, and said blades being disposed adjacent to the lower end of the shank.

WILLIAM F. GAGNER.